No. 646,080. Patented Mar. 27, 1900.
H. G. SIMMONS.
VEHICLE BRAKE.
(Application filed July 22, 1899.)
(No Model.)
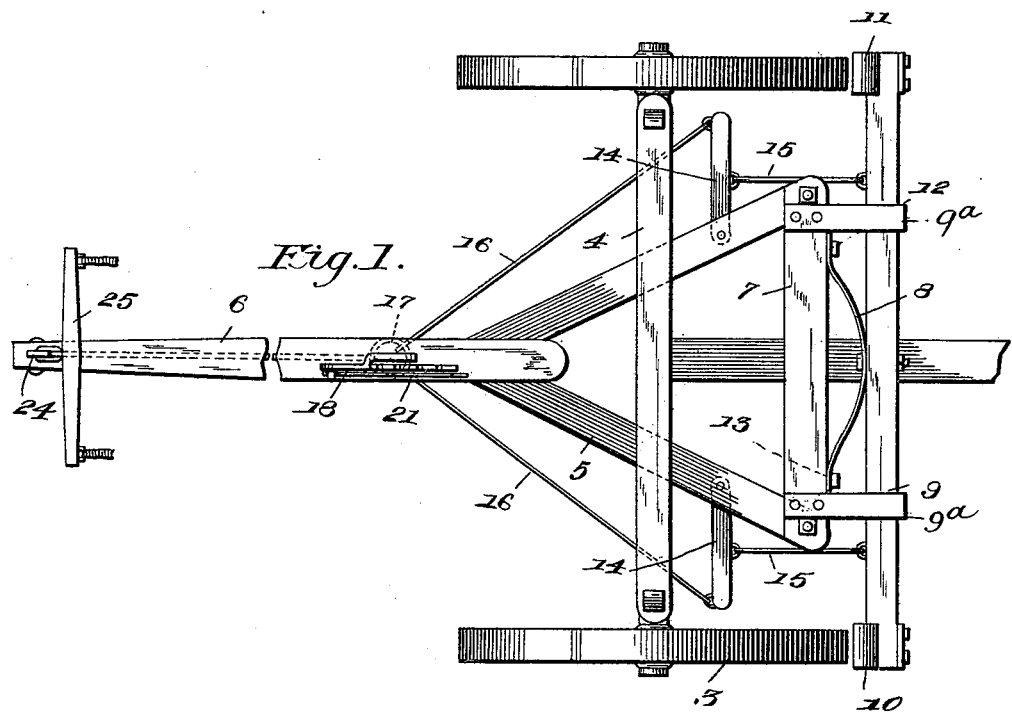
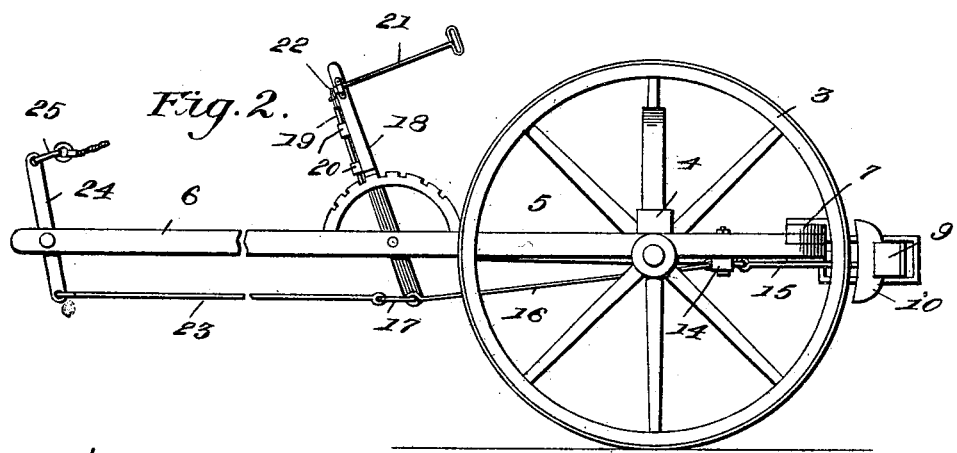
Witnesses: Inventor:
H. G. Simmons,

UNITED STATES PATENT OFFICE.

HENRY G. SIMMONS, OF ALBERTVILLE, ALABAMA.

VEHICLE-BRAKE.

SPECIFICATION forming part of Letters Patent No. 646,080, dated March 27, 1900.

Application filed July 22, 1899. Serial No. 724,846. (No model.)

*To all whom it may concern:*

Be it known that I, HENRY G. SIMMONS, a citizen of the United States, residing at Albertville, in the county of Marshall and State of Alabama, have invented a new and useful Vehicle-Brake, of which the following is a specification.

My invention relates to wagon-brakes, but more particularly to automatic brakes, and has for its object to provide a device of the character described which will normally be held out of engagement with the wheels as the horses pull the vehicle, but will automatically engage the tire of the wheels as the horses pull back or the tension is removed from the operating-rod.

Another object is to provide a suitable means whereby the brake can be used as a hand-brake and the brake-shoes applied to the wheels by the driver from his seat on the vehicle should the horses attempt to run away.

My invention further consists in the parts and combination of parts, as will be more fully described in the accompanying specification, illustrated in the drawings, and pointed out in the claims hereunto annexed.

In the drawings, Figure 1 is a top plan view of the forward part of a running-gear of a wagon, showing my invention applied thereto. Fig. 2 is a side elevation of the same.

Referring to the drawings by numerals, 3 indicates the wheels, journaled on the axle 4. 5 designates the hounds, carried by the axles, and 6 the tongue. To the cross-bar 7 of the hounds is secured a bowed spring 8, carrying the brake-beam 9 intermediate its ends, on which are the brake-shoes 10 and 11. This spring 8 is slotted at 12 and 13 to permit a slight play thereof on the cross-bar 7 when the brake-shoes are brought into or out of engagement with the wheels. As a further support to the brake-beam I provide the supports 9ª, attached to the beam 7 and in which the brake-beam slides.

On each of the hounds 5 is an outwardly-projecting pivotally-secured lever 14, connected to the brake-beam by means of a linked rod 15, secured intermediate the ends of the beam and lever. To the outer end of each lever is secured a longer connecting-bar 16, having their ends brought together and connected by a loop or ring 17, to which is attached the lower end of a pivoted hand-lever 18, carried by the tongue of the wagon and adapted to be held and retained at any desired inclination through the medium of the reciprocating pawl 19, working in the loops 20, secured on said lever and rod 21, to the crank-arm 22 of which it is attached.

23 is a longitudinally-arranged operating-rod secured to the link 17 at its rear end and to the forward end of which is attached the lower end of the pivoted lever 24, carrying the neck-yoke 25 at its upper extension.

The operation of my device is as follows: When going downhill, the horses will hold back on the neck-yoke 25, and thereby draw forward the rod 23, and, through the medium of the rods 16, levers 14, and link 15, will force the brake-shoes against the wheels, as will be obvious by reference to the drawings. As soon as the horse again starts the spring 8 will force the brake-beam away from the wheels and the braking operation will cease.

When it is desired to use the device as a hand-brake or to prevent the horses from applying the brake when backing the wagon, the pawl 19 will be dropped in one of the notches of the segmental rack 20, and the brake can then only be applied by turning rod 21, on the end of which is the crank-arm 22, and thereby release the lever 18, when by pulling back on the rod 21 the brake can be applied from the seat of the wagon. Of course it is obvious from the foregoing that the brake can be applied from the seat by the driver in case the horses attempt to run away.

While I have illustrated and described what to me appears to be the best means for accomplishing the desired end, I would have it understood that I reserve the right to make such slight changes and alterations as would properly come within the scope of my invention without departing from the spirit thereof.

Having thus fully described my invention, what I claim as new, and desire to secure by Letters Patent of the United States, is—

1. In a wagon-brake the combination with the running-gear, of the traction-wheels journaled thereon, of a bowed spring secured to the rear of the running-gear and carrying a transverse brake-beam, two outwardly-projecting levers projecting from the running-gear and connected to the transverse brake-beam, by a linked rod, the two longer rods engaging the outwardly-extending ends of the levers and connected by a link and a pivoted lever secured to the tongue and engaging the link at the lower end thereof, a segmental rack on said tongue and a pawl carried by the lever and designed to engage the rack whereby the brake-shoes can be held in or out of engagement with the wheels, substantially as described.

2. In a wagon-brake, the combination with the hounds, a brake-beam loosely supported from the hounds, a bowed spring interposed between the beam and hound, of levers pivoted to each side of the hounds, a linked rod connecting each of said levers with the brake-beam, rods pivoted to and extending forward from said levers and secured together at their forward ends by a link, a lever pivoted to the pole of the wagon, the lower end of which is secured to said link, a pawl or dog secured to the upper end of said lever, and an operating-rod comprising a handle and a crank formed on the outer end of the said rod, secured to the upper end of the said lever, the dog or pawl being connected to the crank, a sector on said pole with which the dog is adapted to engage.

3. In a wagon-brake, the combination with the hounds, a brake-beam loosely supported therefrom, a bowed spring interposed between the beam and hound, levers pivoted to each side of the hound, and connected to the beam by linked rods, rods pivoted to and extending forward from said levers and secured together at their forward ends by a link, a lever pivoted to the pole of the wagon, the lower end of which is secured to said link, an operating-handle, a crank integral with the outer end of the same and loosely secured to the top of said lever, a pawl or dog connected to said crank and operating in guides on the lever, a sector secured to the pole, of a lever pivoted to the forward end of the pole, a rod connecting its lower end with the first-named lever and said rods extending from the hound and a neck-yoke secured to the upper end of the lever pivoted to the forward end of the pole.

HENRY G. SIMMONS.

Witnesses:
F. T. STEPHENSON,
R. C. BEANER.